Figure 1:
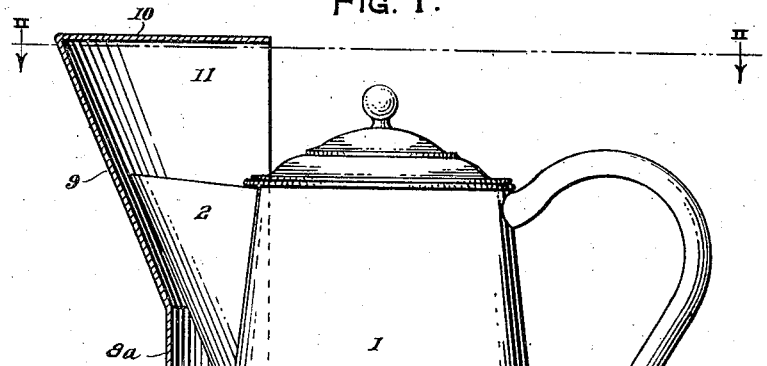

Dec. 2, 1924. 1,517,436

L. KOCJAN

COFFEEPOT HOLDER

Filed June 2, 1923

Inventor
L. Kocjan

By
J. K. Bryant
Attorney

Patented Dec. 2, 1924.

1,517,436

UNITED STATES PATENT OFFICE.

LOUIS KOCJAN, OF MILWAUKEE, WISCONSIN.

COFFEEPOT HOLDER.

Application filed June 2, 1923. Serial No. 643,026.

*To all whom it may concern:*

Be it known that I, LOUIS KOCJAN, a citizen of the United States of America, residing at Milwaukee, in the county of Milwaukee and State of Wisconsin, have invented certain new and useful Improvements in Coffeepot Holders, of which the following is a specification.

This invention relates to certain new and useful improvements in coffee pot holders and has for its primary object to provide a holder or support for coffee pots when placed upon a table.

Another object of the invention is to provide a coffee pot holder in the form of a base spindle in which the coffee pot is mounted with a guard wall projecting upwardly from the base receptacle and overlying the pouring spout of the coffee pot to receive the coffee splashing through the spout and direct the same to the base receptacle and prevent the soiling of the table linen.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views,—

Figure 4:
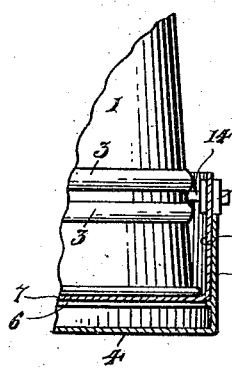
Figure 3:
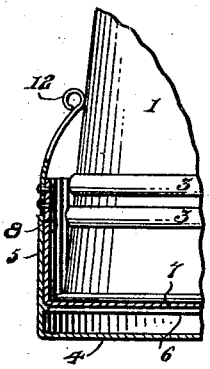
Figure 2:
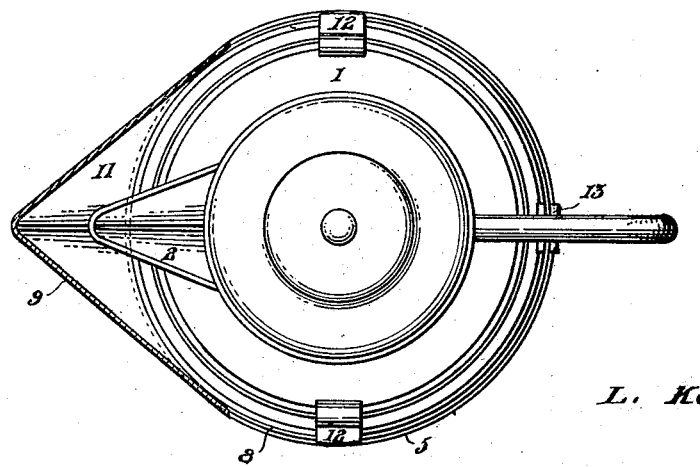

Figure 1 is a side elevational view of a coffee pot with the holder therefor shown in vertical section, Figure 2 is a horizontal sectional view taken on line II—II of Fig. 1 showing the guard wall of the holder inclosing the pouring spout of the coffee pot, Figure 3 is a fragmentary detail sectional view showing a spring arm carried by the holder engaging the coffee pot, and Figure 4 is a fragmentary detail sectional view showing the lock carried by the holder cooperating with the coffee pot for retaining the same in the holder.

Referring more in detail to the accompanying drawing, the reference numeral 1 designates a coffee pot having a pouring spout 2 at its upper end thereof, the pot 1 being of the usual frusto-conical formation and having a pair of spaced outwardly directed annular beads 3 adjacent the lower end thereof.

The holder for the pot 1 includes an outer base receptacle having a bottom wall 4 and an annular side wall 5, the inner face of the annular side wall 5 at a point spaced upwardly from the bottom wall 4 carrying an inwardly directed annular rib 6.

The inner receptacle of the coffee pot holder embodies a bottom wall 7 and an annular wall 8, the wall 7 adapted for seating engagement on the annular rib 6 while the side walls 5 and 8 intimately contact each other as illustrated in Figs. 1, 3 and 4. A guard is associated with the pouring spout 2 of the pot, one side of the wall 8 carrying an upward extension 8ª, while the upper end of the extension 8ª is flared outwardly as at 9 and is provided at the extreme upper end thereof with a flat cross wall 10, forming a pocket 11 as illustrated in Fig. 1 into which the spout 2 of the coffee pot extends, the flat upper wall 10 overlying the open upper side of the spout 2 while the forwardly inclined wall 9 will direct coffee or other fluid flowing outwardly of the spout 2, downwardly into the inner section of the coffee pot holder.

In order to accomplish a substantial support for the coffee pot within the holder, the upper edge of the side wall 8 carries spring arms 12 that engage the side wall of the pot 1 as shown in Figs. 2 and 3, while the pot may be locked within the holder by the key mechanism 13 supported adjacent the upper edge of the wall 8 and having a projection bolt 14 to be positioned between the spaced beads 3 on the coffee pot as shown in Fig. 4.

From the above detail description of the device, it is believed that the construction and operation thereof will at once be apparent, it being noted that the guard for the spout 2 will direct coffee overflowing therefrom back into the holder and preventing the coffee from splashing or falling upon a table or other object supporting the pot. If desired, the coffee pot may be placed within the holder that in turn is mounted upon a burner and the coffee maintained at the proper temperature and any coffee that overflows through the spout 2 will be directed backwardly into the holder.

While there is herein shown and described the preferred embodiment of the present invention, it is nevertheless to be understood that minor changes may be made therein without departing from the spirit and scope of the invention as claimed.

What is claimed as new is:—

1. In a coffee pot holder, a holder receptacle adapted to support a coffee pot and a guard carried by the receptacle adjacent the spout of the pot, said receptacle embodying an outer base pan and an inner receptacle removably mounted therein.

2. In a coffee pot holder, a holder receptacle adapted to support a coffee pot and a guard carried by the receptacle overlying the spout of the pot to direct overflowing coffee back into the holder receptacle, said receptacle embodying an outer base pan and an inner receptacle removably mounted therein.

3. In a coffee pot holder, a holder receptacle adapted to support a coffee pot, a guard carried by the receptacle adjacent the spout of the pot, said receptacle embodying an outer base pan and an inner receptacle removably mounted therein, spring arms carried by the inner receptacle adapted to engage the pot to substantially support the same, and a lock for retaining the pot in the holder.

4. In a coffee pot holder, a holder receptacle adapted to support a coffee pot, a guard carried by the receptacle overlying the spout of the pot to direct overflowing coffee back into the holder receptacle, said receptacle embodying an outer base pan and an inner receptacle removably mounted therein, spring arms carried by the inner receptacle adapted to engage the pot to substantially support the same and a lock for retaining the pot in the holder.

In testimony whereof I affix my signature.

LOUIS KOCJAN.